US006924849B1

(12) United States Patent
Clifton et al.

(10) Patent No.: US 6,924,849 B1
(45) Date of Patent: Aug. 2, 2005

(54) IMAGE PROJECTION SYSTEM WITH MULTIPLE ARC LAMPS AND FLYSEYE LENS ARRAY LIGHT HOMOGENIZER DIRECTING POLYCHROMATIC LIGHT ON A LIQUID CRYSTAL DISPLAY

(75) Inventors: Benjamin R. Clifton, Oregon City, OR (US); John P. Fogarty, Oregon City, OR (US)

(73) Assignee: Clarity Visual Systems, Inc., Wilsonville, OR (US)

( * ) Notice: Subject to any disclaimer, the term of this patent is extended or adjusted under 35 U.S.C. 154(b) by 353 days.

(21) Appl. No.: 09/877,546

(22) Filed: Jun. 8, 2001

Related U.S. Application Data

(63) Continuation-in-part of application No. 09/425,316, filed on Oct. 21, 1999, now Pat. No. 6,273,570.

(51) Int. Cl.[7] ..................... G02F 1/13357; G03B 21/28; G02B 27/30
(52) U.S. Cl. ............................. 349/5; 353/99; 359/618; 359/641
(58) Field of Search ........................... 349/5–10; 353/30, 353/94, 99; 359/618, 625, 627, 641

(56) References Cited

U.S. PATENT DOCUMENTS

| | | | |
|---|---|---|---|
| 4,257,694 A | 3/1981 | Reinhard ..................... 353/78 |
| 4,572,632 A | 2/1986 | Bodier et al. ................. 353/71 |
| 4,640,597 A | 2/1987 | Okano et al. ................. 353/79 |
| 4,730,919 A | 3/1988 | Schuch ........................ 353/79 |
| 4,810,086 A | 3/1989 | Tachibana et al. ............ 353/79 |
| 4,936,657 A | * | 6/1990 | Tejima et al. .................. 349/7 |
| 5,135,300 A | * | 8/1992 | Toide et al. .................. 353/31 |
| 5,184,248 A | 2/1993 | de Vaan et al. ............. 359/483 |
| 5,278,595 A | 1/1994 | Nishida et al. ............... 353/78 |
| 5,371,559 A | 12/1994 | San-Nohe et al. ............ 353/31 |
| 5,422,691 A | 6/1995 | Ninomiya et al. ............ 353/69 |
| 5,440,424 A | 8/1995 | Wu et al. .................... 359/495 |
| 5,450,219 A | * | 9/1995 | Gold et al. ..................... 349/5 |
| 5,467,154 A | 11/1995 | Gale et al. .................. 353/119 |
| 5,473,339 A | 12/1995 | Kanatani et al. .............. 345/87 |
| 5,555,114 A | 9/1996 | Narita et al. ................. 359/65 |
| 5,601,351 A | 2/1997 | van den Brandt ............ 353/20 |
| 5,622,419 A | 4/1997 | Holder et al. ............... 353/119 |
| 5,623,349 A | * | 4/1997 | Clarke .......................... 349/8 |
| 5,626,408 A | 5/1997 | Heynderickx et al. ........ 353/20 |
| 5,661,825 A | 8/1997 | Van Dam et al. ............. 385/11 |
| 5,671,993 A | 9/1997 | Shikama ...................... 353/77 |
| 5,710,609 A | * | 1/1998 | Shimada ..................... 349/126 |

(Continued)

OTHER PUBLICATIONS

"Optical Systems for LCD Projectors", Minolta Co., Ltd., Osaka, Japan, ©1999, URL: www.minolta.com/optical/01.html, pp 1 and 2.

"HDTV Model No.: P61310", RCA Corporation circa May 10, 2001, URL: www.rca.com/content/procuctspecs/0,1327, PI45022–C11206,00.html?, pp 1–6.

*Primary Examiner*—Andrew Schechter
(74) *Attorney, Agent, or Firm*—Stoel Rives LLP

(57) ABSTRACT

A projector (12N) of this invention employs a 380 mm diagonal, amorphous silicon LCD (80) for receiving light rays from a light source (70), which achieves a small source size by employing four lamps (160) with small arc gaps (166) and a "pinwheel" mirror (164) that overlaps light rays from each of the arc lamps into a single collimated light bundle. The small source size produces a small cone angle (130) of light through the LCD. A lens (78) directs the narrow cone of light though the LCD at an optimal angle for achieving a 1,500:1 contrast ratio. Only a 4× magnification ratio is required to achieve a 170 cm (67 inch) diagonal projected image, which ratio enables projecting SXGA or greater resolution images with a five element projection lens (86). The LCD achieves an operational life of at least 50,000 hours before projected images display color degradation.

16 Claims, 8 Drawing Sheets

U.S. PATENT DOCUMENTS

| | | | |
|---|---|---|---|
| 5,758,940 A | * 6/1998 | Ogino et al. | 353/38 |
| 5,836,664 A | 11/1998 | Conner et al. | 353/70 |
| 5,838,865 A | 11/1998 | Gulick | 385/121 |
| 5,868,481 A | 2/1999 | Conner et al. | 353/38 |
| 5,884,991 A | * 3/1999 | Levis et al. | 353/122 |
| 6,043,797 A | 3/2000 | Clifton et al. | 345/1 |
| 6,273,570 B1 | * 8/2001 | Clifton et al. | 353/74 |
| 6,545,814 B2 | * 4/2003 | Bartlett et al. | 359/636 |

* cited by examiner

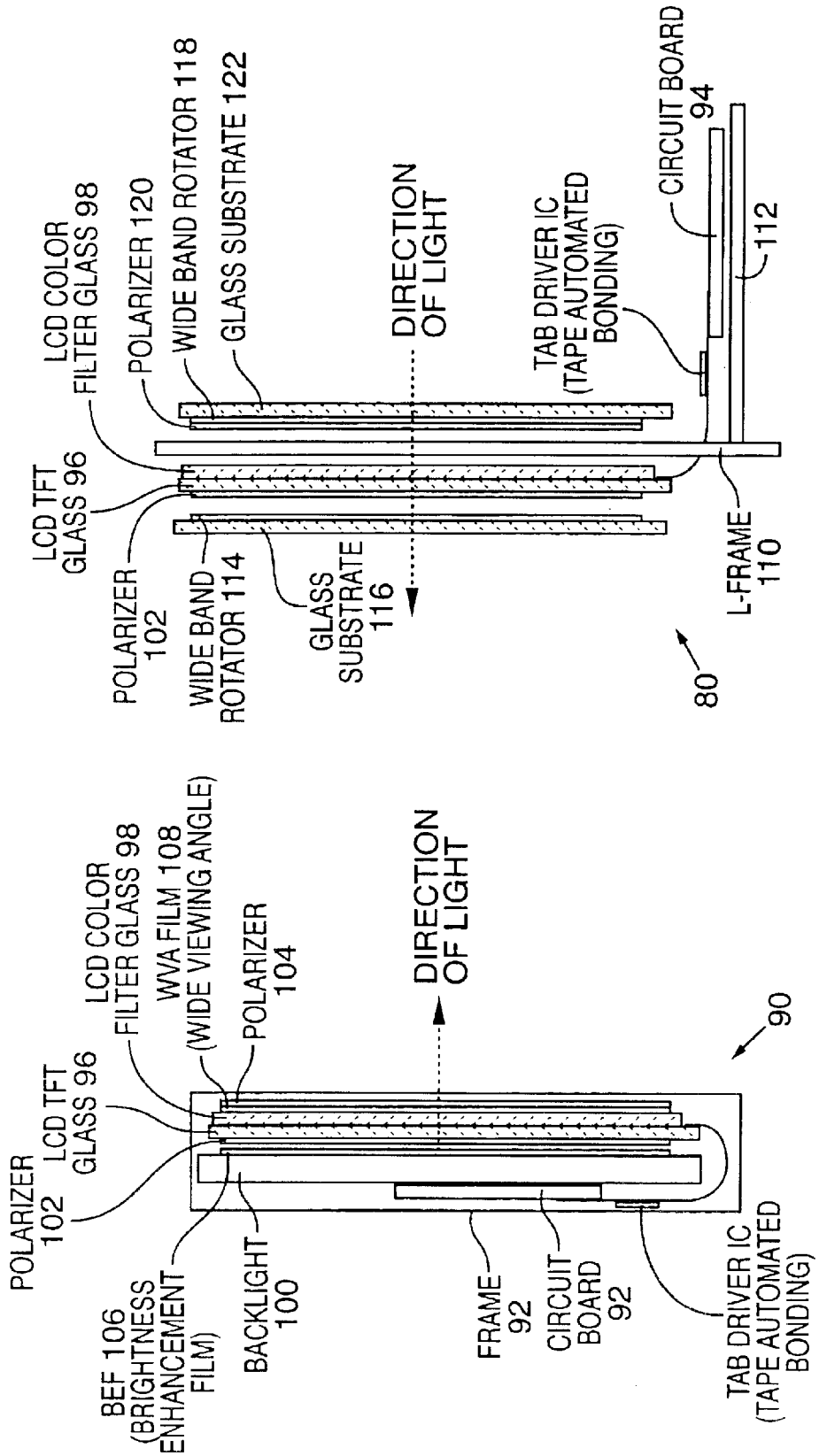

Small source, small LCD = medium cone angle

Small source, large LCD = smallest cone angle

Large source, small LCD = largest cone angle

Large source, large LCD = medium cone angle

IMAGE PROJECTION SYSTEM WITH MULTIPLE ARC LAMPS AND FLYSEYE LENS ARRAY LIGHT HOMOGENIZER DIRECTING POLYCHROMATIC LIGHT ON A LIQUID CRYSTAL DISPLAY

RELATED APPLICATIONS

This application is a continuation-in-part of U.S. patent application Ser. No. 09/425,316, filed Oct. 21, 1999, for COMPACT LIGHT PATH AND PACKAGE FOR LIQUID CRYSTAL PROJECTION DISPLAYS, now U.S. Pat. No. 6,273,570.

FEDERALLY SPONSORED RESEARCH OR DEVELOPMENT

Not Applicable

TECHNICAL FIELD

This invention relates to video projection displays and more particularly to an apparatus and a method for improving the resolution, image size, brightness, and useful life of such displays.

BACKGROUND OF THE INVENTION

There are previously known projection displays employing various technologies to achieve large display screen dimensions, e.g., greater than about 40 diagonal inches. Such displays include imaging devices selected from among cathode-ray, liquid crystal, plasma, and field emission technologies employed in single and multiscreen arrangements. Problems with such displays include high cost, poor luminance and uniformity, limited screen size, brightness, contrast ratio, resolution, and useful life (reliability).

When an array of such displays is configured in a multiscreen arrangement, additional problems arise because of difficulties in achieving visually seamless display boundaries among the displays. In particular, arrayed projection displays require precise image edge matching and uniformly bright luminance across the entire projected image. Multiscreen displays exacerbate any image matching and nonuniformity problems because each display provides a subdivided portion of a total image, the multiple boundaries of which must appear as inconspicuous as possible. Unfortunately, when using projection displays in a multiscreen arrangement, it is especially difficult to achieve a visually seamless display because of luminance and color nonuniformities and geometric distortions that typically exist from screen to screen and from the center-to-edge of each screen. These problems effectively eliminate magnetically deflected cathode-ray tube displays from use in arrays.

Projection displays employing digitally addressed light valves have evolved to a point where many of the above-described problems can be solved. In particular, liquid crystal light valves have enabled implementing cost-effective, high resolution displays, albeit with some remaining luminance, uniformity, contrast ratio, and life problems. Solutions to some of these problems are described in U.S. Pat. No. 6,043,797 for COLOR AND LUMINANCE CONTROL SYSTEM FOR LIQUID CRYSTAL PROJECTION DISPLAYS and U.S. Pat. No. 6,273,570 for COMPACT LIGHT PATH AND PACKAGE FOR LIQUID CRYSTAL PROJECTION DISPLAYS, both of which are assigned to the assignee of this application and are incorporated herein by reference.

Referring to Table 1, the displayable resolution of such displays has evolved from VGA to SXGA resolutions and formats. Applicants' current projection displays offer SXGA resolution images having a greater than 1000:1 contrast ratio on a 170 cm (67 inch) diagonal screen. This performance level has opened the market for such displays in non-arrayed configurations for use in command and control, conference room, board room, and high-end home theater applications. There is, of course, a market-driven demand for ever-increasing display performance and an ever-decreasing cost.

TABLE 1

| RESOLUTIONS: | H x V PIXELS/FORMATS |
|---|---|
| QVGA | 320 x 240 |
| W-QVGA | 480 x 240 |
| VGA | 640 x 480 |
| W-VGA | 852 x 480 |
| SVGA | 800 x 600 |
| XGA | 1024 x 768 |
| W-XGA | 1365 x 768 |
| SXGA | 1280 x 1024 |
| SXGA+ | 1400 x 1050 |
| UXGA | 1600 x 1200 |
| W-UXGA | 1920 x 1200 |
| QXGA | 2048 x 1536 |
| 480I | Interlaced NTSC 480 Line TV (640 x 480) |
| 480P | Progressive NTSC 480 Line TV (640 x 480) |
| 720P | Progressive ATSC 720 Line HDTV (1280 x 720) |
| 1080I | Interlaced ATSC 1080 Line HDTV (1920 x 1080) |
| 1080P | Progressive ATSC 1080 Line HDTV (1920 x 1080) |

Various models of liquid crystal light valves (hereafter "LCDs") are available including transmissive, reflective, monochrome, color, and small- and large-panel configurations. Small panel LCDs are commonly used in portable and conference room multimedia projectors. Their current resolution is limited to SXGA format on a 4.57 cm (1.8 inch) diagonal monochrome polysilicon (transmissive or reflective) LCD used in costly 3-path color video projectors. To achieve a useable projected image brightness, very intense light impinges on the LCDs and is magnified 33x to 100x by a projection lens to achieve a useable image size. Unfortunately, maintaining SXGA image quality with the 33x to 100x magnification ratio requires using a relatively expensive 11–15 element wide-angle projection lens. Moreover, the high intensity light impinging on the polysilicon LCDs causes their failure by rapid discoloration after about 10,000 hours of use. Also such LCD projection displays have a contrast ratio of less than about 500:1.

Some of the above-described problems have been overcome in projection displays employing a single large panel, LCD. An example of such a display employing a 16.2 cm (6.4 inch) full-color projection panel is described in the above-cited '316 application. Unfortunately, such LCDs are very inefficient, passing only about 7 percent of the impinging light. However, adequate projected image brightness can be achieved with a sufficiently bright light source and, fortunately, the overall cost is reduced, the contrast ratio is greater than 1000:1, and the projection lens is simpler.

SUMMARY OF THE INVENTION

An object of this invention is, therefore, to provide an SXGA or higher resolution projection display having high brightness, 1500:1 contrast ratio, at least 50,000 hour life, and luminance and color uniformity suitable for use in large and multiscreen projection display applications.

Another object of this invention is to provide a method for modifying a direct view LCD panel for use in projection display applications.

A further object of this invention is to provide an improved light source for use in projection display applications.

A high performance rear screen projector of this invention employs a modified 380 mm (15 inch) diagonal, high resolution, amorphous silicon, LCD panel for receiving intense light rays from an arc lamp light source. The light source achieves a small effective source size relative to the LCD panel size by employing four lamps with 1.3 mm arc gaps and a "pinwheel" mirror configuration that reflects and overlaps light rays from each of the arc lamps into a single collimated light bundle. The small effective source size produces a very small cone angle of light propagating through the LCD panel. A Fresnel lens directs the narrow cone of light though the LCD panel at an optimal ray angle for achieving a 1,500:1 image contrast ratio. Because of the large size of the LCD panel, only a 4× magnification ratio is required to achieve a 170 cm (67 inch) diagonal projected image. The small magnification ratio enables projecting SXGA or greater resolution images with a relatively low cost five or fewer element projection lens. The large, amorphous silicon LCD panel achieves an operational life of at least 50,000 hours before the projected images display color degradation.

The projector of this invention is advantageous because it achieves a combination of screen size, resolution, contrast ratio, operational life, and low implementation cost not achieved in prior projectors.

Additional objects and advantages of this invention will be apparent from the following detailed description of preferred embodiments thereof that proceeds with reference to the accompanying drawings.

BRIEF DESCRIPTION OF THE DRAWINGS

FIG. 7 is a sectional side pictorial view representing a prior art direct view LCD panel.

FIG. 8 is a sectional side pictorial view representing the direct view LCD panel of FIG. 7 as modified for use in a projector of this invention.

DETAILED DESCRIPTION OF PREFERRED EMBODIMENTS

Figure 1:
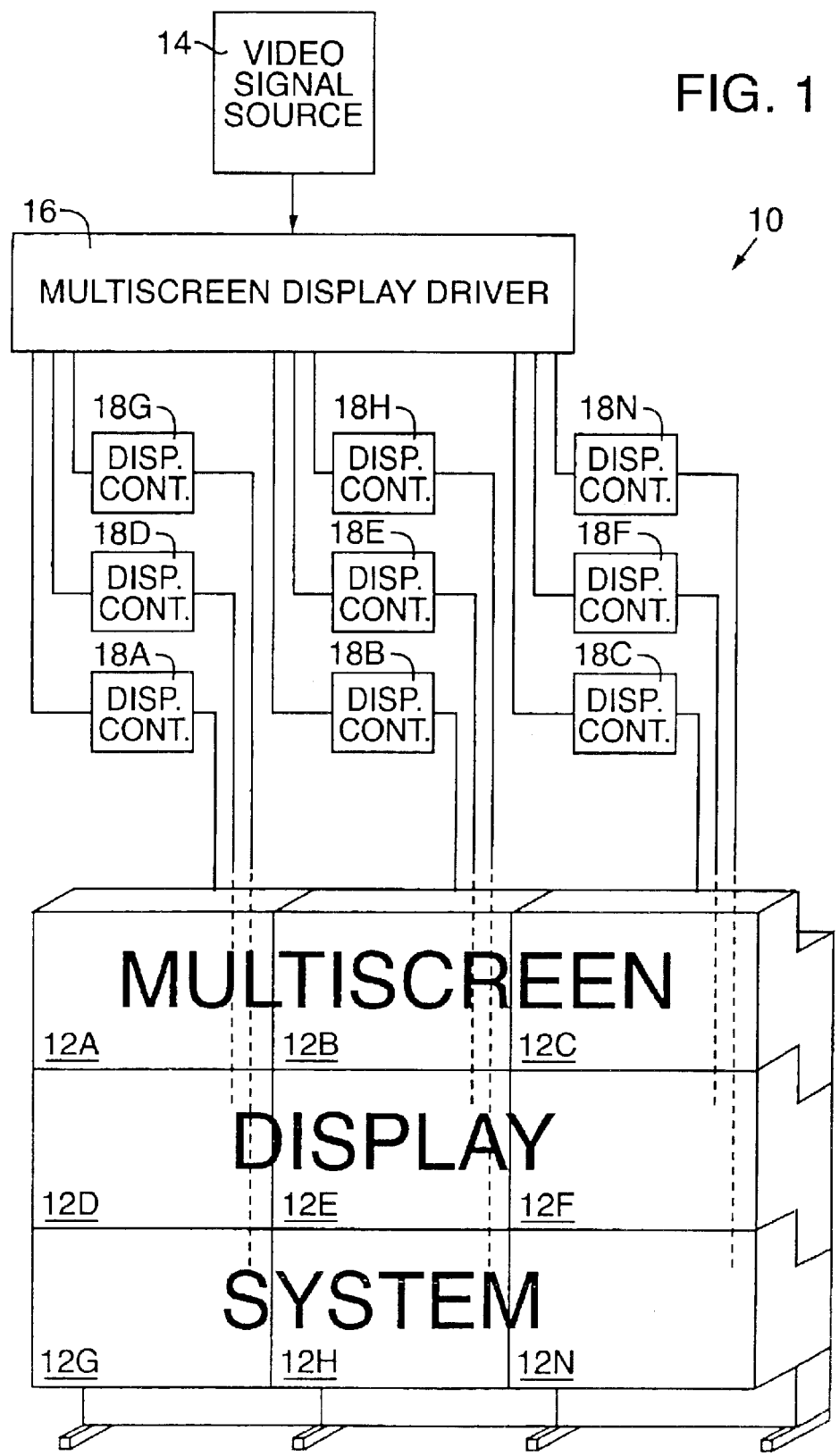
FIG. 1 is a simplified pictorial block diagram of a representative multiscreen display system.

FIG. 1 shows a representative multiscreen display system 10 employing a three-by-three array of LCD projectors 12A, 12B, . . . to 12N (collectively, projectors 12). N may be as small as two and as big as practical to form a very large array of projectors 12. Of course, any of projectors 12 may also be employed in a stand-alone projector configuration. In the multiscreen configuration shown, a conventional video signal source 14 drives a conventional multiscreen display driver 16. Each of projectors 12 is interconnected with multiscreen display driver 16 by associated display controllers 18A, 18B, . . . to 18N that perform LCD projection luminance and color balance functions as described in the above-cited U.S. Pat. No. 6,043,797. Display controllers 18 are preferably integrated within projectors 12. Multiscreen display system 10 substantially seamlessly displays a total image.

Figure 3:
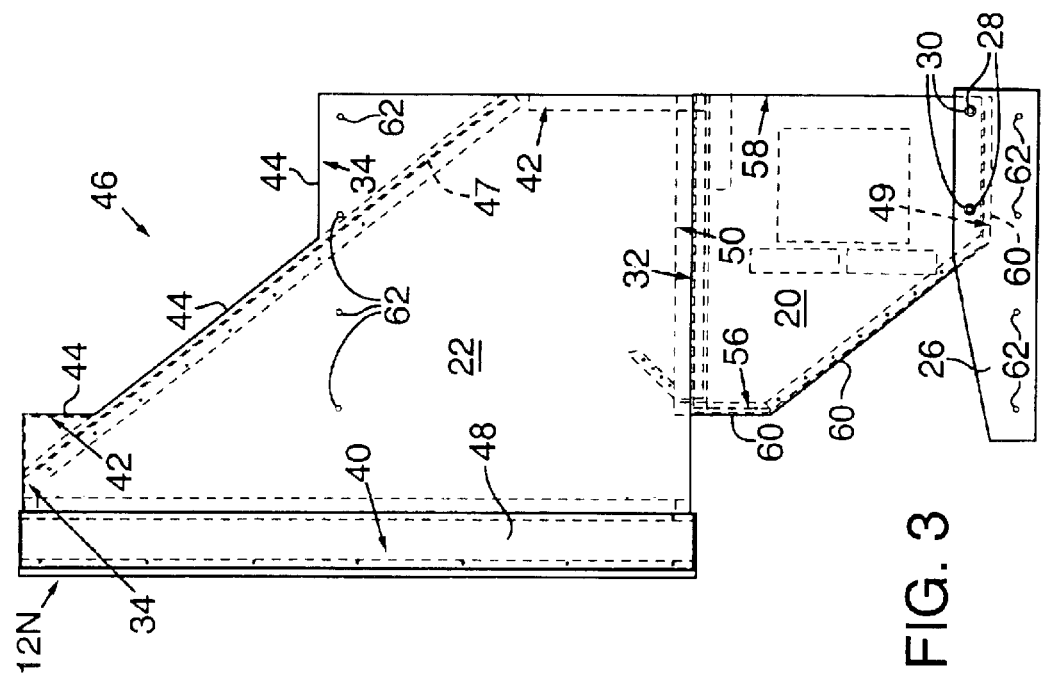
FIGS. 2 and 3 are respective front and right side pictorial elevation views showing structural components of an LCD projection display package of this invention arranged in a first operational configuration.
Figure 2:
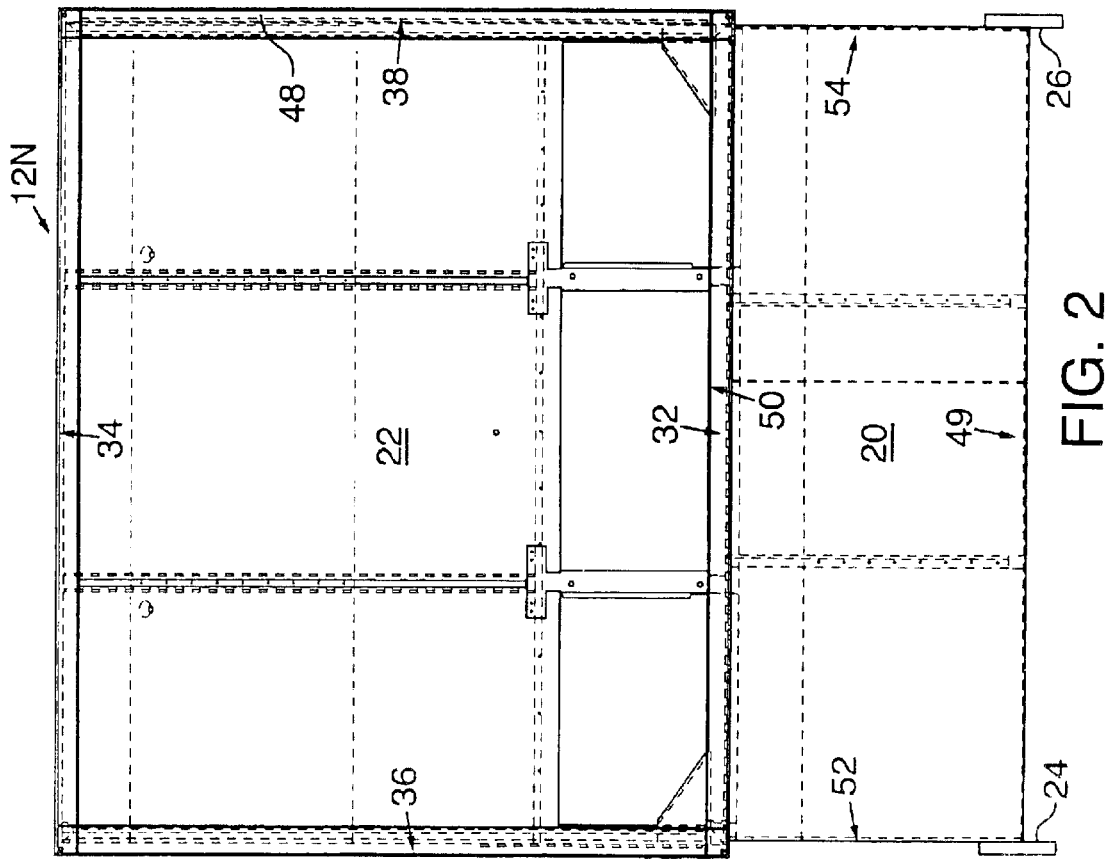

FIGS. 2 and 3 show respective front and right side views of a representative one, for example 12N, of projectors 12 of this invention. The mechanical packaging of LCD projector 12N is stackable and includes a pedestal portion 20 and a housing portion 22. Pedestal portion 20 is supported by respective left and right legs 24 and 26 that are attached by screw fasteners 28 threaded into PEM nuts 30 that are pressed into the bottom side margins of pedestal portion 20. Left and right legs 24 and 26 preferably protrude forward from the left and right bottom side margins of pedestal portion 20.

Pedestal portion 20 preferably encloses electronic and optical components, such as a power supply, light source, display controller 1 BN, an LCD module, and related optical components. The top side of pedestal portion 20 includes an opening that mates with a corresponding opening in the bottom side of housing portion 22 to form a first operational configuration of projector 12N as shown in FIGS. 2 and 3. The electronic and optical components slide into the rear of pedestal portion 20 and are, because of the above-described openings, accessible from the front or rear of projector 12N. When projector 12N is in the first operational configuration, the top side of pedestal portion 20 is mated to the bottom side of housing portion 22 by sliding together mating channels and surfaces formed along marginal edges of the top side of pedestal portion 20 and the bottom side of housing portion 22.

Housing portion 22 includes a bottom side 32, a top side 34, a left side 36, a right side 38, a front side 40, and a rear side 42 in which at least the top side 34 and the rear side 42 include surfaces 44 that are shaped to form a contoured recess 46. Housing portion 22 encloses a large fold mirror 47 (shown in dashed lines in FIGS. 3 and 4) and supports on front side 40 a removable projection screen and a frame 48. The projection screen is represented in FIGS. 2 and 5 as a transparent surface to reveal interior details.

Figure 4:
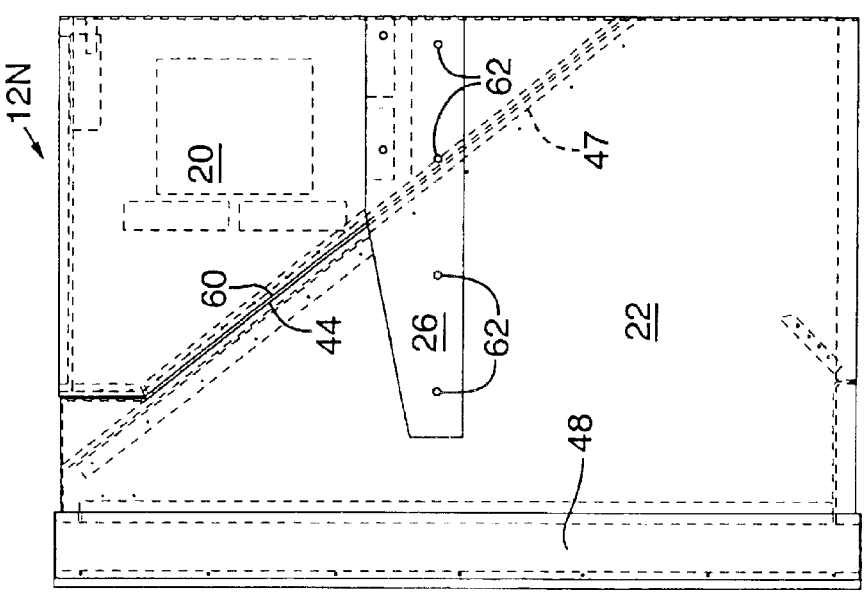
FIG. 4 is a right side view of the LCD projection display package of FIGS. 2 and 3 arranged in a shippable configuration.

Pedestal portion 20 includes a bottom side 49, a top side 50, a left side 52, a right side 54, a front side 56, and a rear side 58 in which at least the bottom side 49 and the front side 56 include surfaces 60 that are sized to mate with contoured recess 46 in housing portion 22, thereby placing projector 12N in a shippable configuration as shown in FIG. 4. When projector 12N is in the shippable configuration, pedestal portion 20 is secured to housing portion 22 by fasteners passing through mating holes 62 formed in left and right legs 24 and 26 and in left and right sides 36 and 38 of housing portion 22.

Figure 5:
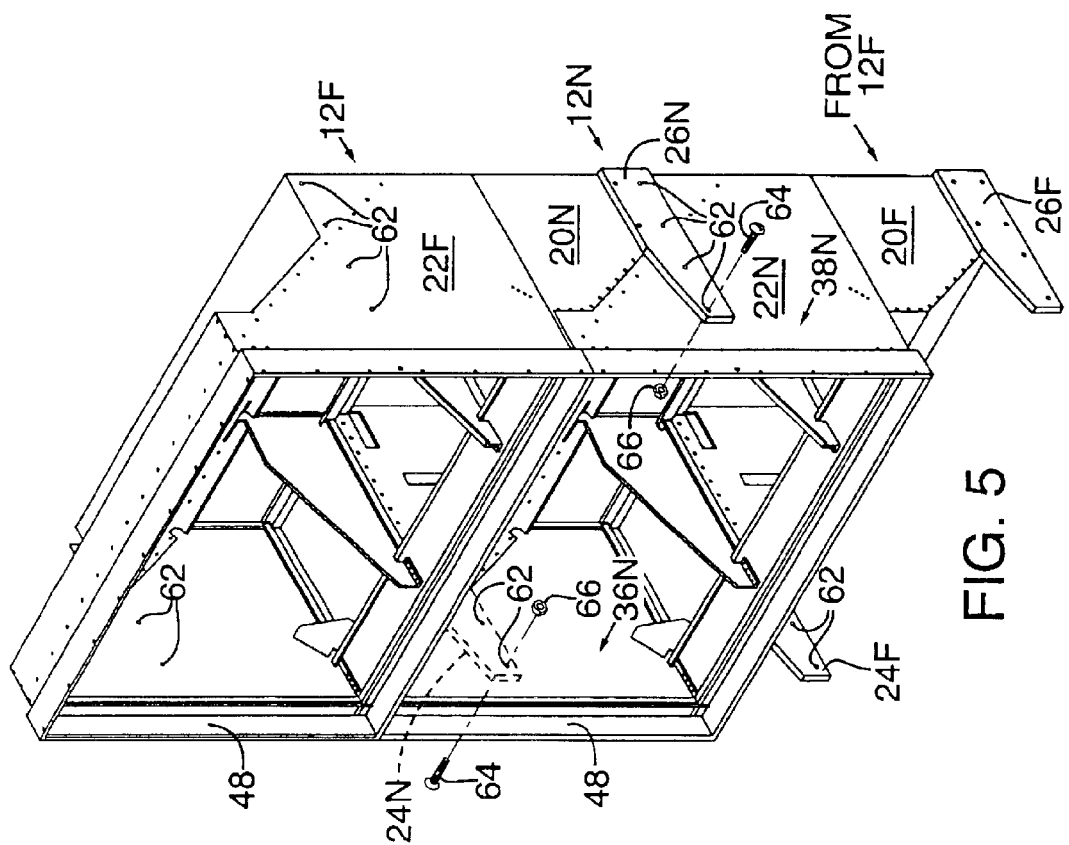
FIG. 5 is an isometric view of a vertically stacked pair of the LCD projection display packages of FIGS. 2–4.

FIG. 5 shows that when a second substantially identical projector, for example projector 12F (as shown in FIG. 1) is stacked vertically above projector 12N, its shippable configuration further forms a second operational configuration. To achieve the FIG. 5 stacking, projector 12N is removed from its shipping container and retained in the shippable configuration. Projector 12F is removed from its shipping container and separated into its housing portion 22F and pedestal portion 20F. Projector 12N is placed on top of and secured to pedestal portion 20F. Housing portion 22F then is placed on top of and secured to the large flat surface formed by the shippable configuration combination of pedestal portion 20N and housing portion 22N.

Upper projector 12F is preferably secured to lower projector 12N by passing fasteners, such as machine screws 64 (representative ones are shown in exploded view), through mating sets of holes 62 in left leg 24N and left side 36N, and in right leg 26N and right side 38N, and tightening them together with associated nuts 66 (representative ones are shown in exploded view).

The original motivation for the shippable configuration was to reduce the overall height and volume of projector 12 to reduce its shipping cost and allow larger versions of projectors 12 to be air shipped when necessary. A preferred commercial embodiment of projector 12 has a height in the first operational configuration of about 152 centimeters (60 inches), which exceed an allowable air shipping size limit, whereas in the height in the shippable configuration is about 107 centimeters (42 inches), which is within the allowable air shipping size limit. Moreover, even for packages within a height limit, reducing shipping container volume reduces air shipping costs.

Beyond the original motivation for the shippable configuration, the second operational configuration of projector 12N has further unexpected and advantageous results. When vertically stacking two or more projectors, it was discovered that only one projector required disassembly from its shipping configuration, and that the upper surface of the lower projector is conveniently flat, resulting in faster, simpler, and safer vertical stacking of projectors 12. Of course, projectors already in the first operational configuration can also be stacked.

Figure 6:
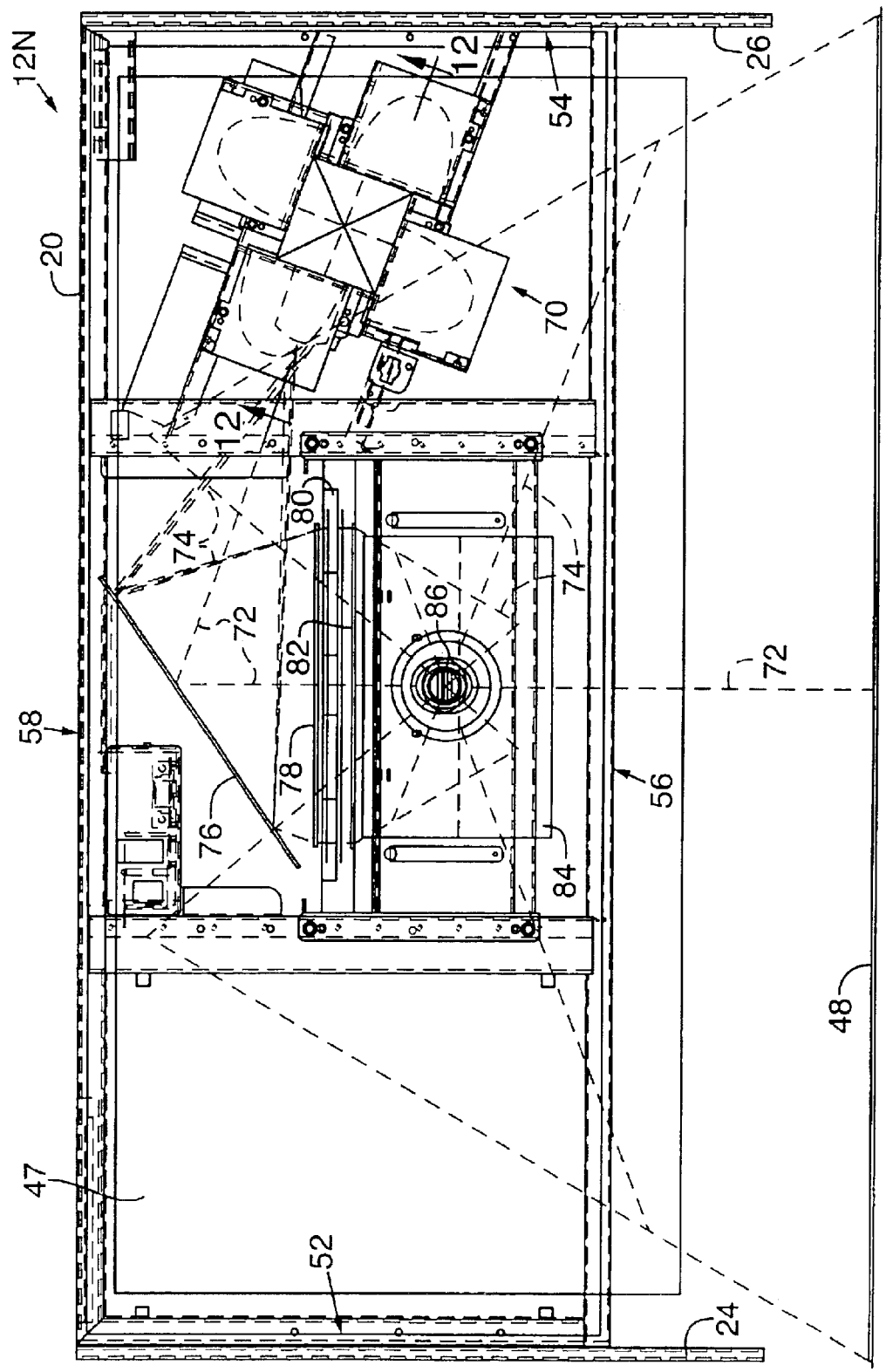
FIG. 6 is a top view into a pedestal portion of the LCD projection display package revealing a multi-lamp light source, LCD assembly, projection lens, and fold mirrors of this invention.

FIG. 6 shows pedestal portion 20 of LCD projection display 12N and reveals major components of a high-performance optical projection system of this invention. These components include a light source 70 that generates light rays including a principal light ray 72 and image margin light rays 74, which rays reflect off a first fold mirror 76, propagate through an input Fresnel lens 78, LCD assembly 80, and an output Fresnel lens 82, reflect upwardly off a second fold mirror 84, propagate through a projection lens 86, and reflect forward off large fold mirror 47 for display on projection screen 48. Large fold mirror 47 and projection screen 48 are shown in FIG. 6 to complete the optical projection system light path even though they are parts of housing portion 22 (FIG. 3) and not parts of pedestal portion 20.

First fold mirror 76, second fold mirror 84, large fold mirror 47 and projection screen 48 are conventional components, whereas light source 70, input Fresnel lens 78, LCD assembly 80, output Fresnel lens 82, and projection lens 86 each contribute to aspects of this invention as set forth below.

Recall that the objects of this invention include providing a projection display having SXGA or higher resolution, high brightness, 1500:1 contrast ratio, at least 50,000 hour life, and luminance and color uniformity suitable for use in large and multiscreen projection display applications. It was determined that prior art polysilicon LCD panels could not achieve this combination of objects. However, large panel (38 cm (15 inch) diagonal), direct view, amorphous silicon LCD displays, designed for use in laptop computers and thin desktop displays, achieve the above objects except for contrast ratio and suitability for use in projection displays. Indeed, amorphous silicon LCD panels having greater than a 50 mm (2 inch) diagonal size are suitable for use in this invention.

FIG. 7 shows a representative prior art direct view LCD panel 90. Major components include a frame 92, a circuit board 94 for driving an LCD thin film transistor ("TFT") glass substrate 96, an LCD color filter glass substrate 98, and a backlight 100. Substrates 96 and 98 each further include respective polarizer layers 102 and 104 that coact with LCD material sandwiched between substrates 96 and 98 and are selectively activated by the TFTs in substrate 96 to propagate or block light generated by backlight 100. Backlight 100 further includes a brightness enhancing film ("BEF") 106. To increase the viewing cone angle of LCD panel 90, substrate 98 further includes a wide viewing angle ("WVA") film 108. Unfortunately, WVA film 108 trades off contrast ratio for viewing cone angle, which is considered more important for direct view panels. The resulting contrast ratio is typically 500:1 or less, which is far below the 1500:1 object of this invention. Because amorphous silicon TFTs are photoconductive, substrate 96 further includes a "black mask" (not shown) for preventing TFT conduction caused by ambient light entering through substrate 98.

Despite the remaining drawbacks of direct view LCD panel 90, this invention provides modifications to LCD panel 90 that optimize its contrast ratio and render it suitable for use in projection displays.

FIG. 8 shows LCD assembly 80 assembly, which is produced by modifying direct view LCD panel 90 according to the following process:

Start with LCD panel 90, which is preferably an SXGA resolution panel model LP157E1, manufactured by LGPhilips, Ltd., in Korea. Suitable alternative direct view SXGA and UXGA panels include the models LP150U1 and LP150x1, manufactured by LGPhilips, Ltd., in Korea; the model LTN150X1, manufactured by Samsung, Ltd., in Korea; and the model ITUX97, manufactured by IBM, Inc., in Japan.

Detach circuit board 94 from frame 92 and fold it out of the way.

Remove backlight 100 and its associate BEF 106 from frame 92.

Remove substrates 96 and 98 and their associated layers from frame 92.

Peel off polarizer layer 104 and WVA film 108 from substrate 98. Polarizer 104 may also include an anti-glare (non-glossy) finish that is intended to increase viewing angle and viewability. However, in projection applications of this invention, the anti-glare finish scatters light and degrades image focus.

Mount substrate 96, associated polarizer 102, and modified substrate 98 on a new L-frame 110 having an area 112 for mounting circuit board 94 out of the light path.

Attach a wide band rotator ("WBR") 114 on a glass substrate 116 and assemble them adjacent to polarizer 102, preferably on L-frame 110. Alternatively, WBR 114 can be applied directly to polarizer 102.

Attach a WBR 118 and a polarizer 120 to a glass substrate 122 and assemble them adjacent to substrate 98, preferably on L-frame 110. Alternatively, WBR 118 and polarizer 120 can be applied directly to substrate 98. This complete assembly 80.

Because intense light propagates from light source 70 (FIG. 6), the substrate 122 side of LCD assembly 80 should face light source 70 so the black mask associated with substrate 96 will prevent the TFTs thereon from unintentionally photoconducting. This light propagation direction is opposite from the direction originally intended for direct view LCD panel 90.

Light propagating through substrates 96 and 98 is typically diagonally polarized. WBR 118 receives horizontally polarized light from light source 70 and delivers through polarizer 120 diagonally polarized light to substrate 98. Likewise, WBR 114 receives diagonally polarized light from polarizer 102 and delivers horizontally polarized light to substrate 116. Horizontal polarization corrects for corner brightness and color purity distortions that can occur in LCD panels and that are typically made worse by optical components, such as fold mirrors 47 and 84. Such distortions are most noticeable along the abutting screen edges of multiscreen display configurations.

The light transmission through amorphous silicon LCD assembly 80 is inefficient (only about 7 percent), but adequate in view of the objects and advantages that are achieved. The light transmission inefficiency is offset by the high intensity of light source 70, which is described with reference to FIGS. 11 and 12.

Using LCD assembly 80 is advantageous because SXGA or greater resolution is achieved. 38.1 cm (15 inch) diagonal LCD assembly 80 is also advantageous because a small 4× magnification ratio is required to produce a 170 (67 inch) image on projection screen 48 (FIG. 6). Magnification ratios greater than unity to about 10× are beneficial in this invention because they result in life enhancing, relatively low light intensity through LCD assembly 80 and enable making projection lens 86 in a relatively inexpensive and simple 4 or 5 element wide-angle configuration. In contrast, prior art multimedia projectors using small LCDs typically have life reducing high light intensities and large 33× to 100X magnification ratios, which require relatively expensive projection lenses having up to 15 elements.

A greater than 1,000:1 contrast ratio, preferably at least about 1,500:1, is achieved through LCD assembly 80 by optimizing a combination of factors. First, as described earlier, WVA film 108 is removed from direct view LCD panel 90 to allow operation with high contrast, narrow viewing cone angles.

In general, LCDs have a peak contrast ratio at an optimal light ray angle through the LCD. The optimal ray angle is determined by the LCD material, its composition, molecular tilt angle, surface rub angle, LCD cell construction, and cell geometry. The optimal ray angle that produces the peak contrast ratio is typically determined by empirical measurement. The same LCD produces iso-contrast contours of diminishing contrast as the light ray angle diverges from the optimal ray angle. If all the light rays pass through the LCD at the optimal ray angle, the peak contrast ratio is achieved. For typical LCDs the peak contrast ratio is achieved with optimal ray angles ranging from about perpendicular to the panel (zero degrees) to about 10 degrees off perpendicular to the panel. The preferred optimal ray angle for LCD assembly 80 is about five degrees off perpendicular and in a generally downward direction assuming LCD assembly 80 is mounted vertically. The optimal ray angle is described in more detail with reference to FIG. 10.

However, if some of the light rays pass through the LCD at angles that diverge from the optimal ray angle, the contrast ratio will be an average of the contrast ratio achieved by all of the light rays. In other words, the peak contrast ratio is achievable only if all the light rays pass through the LCD with very little divergence from the optimal ray angle (a small cone angle). Accordingly, this invention seeks to achieve a high contrast ratio by passing light rays through LCD assembly 80 at the optimal ray angle and with a very small cone angle, preferably less than about +6 degrees.

FIGS. 9A, 9B, 9C, and 9D show LCD illumination cone angles 130 produced by illuminating various combinations of small LCD panels 132 and large LCD panels 134 with small light sources 136 and large light sources 138. As a general rule, LCD illumination cone angle 130 conforms to the following relationship:

LCD Cone Angle=[(Source Cone Angle)(Source Height)]/LCD Height.

Figure 9B:
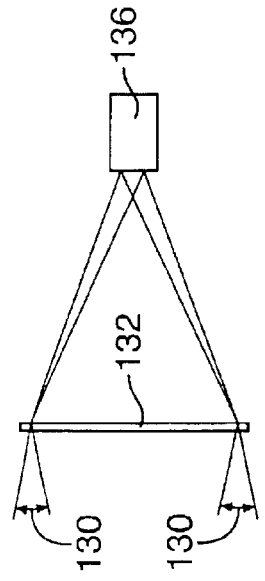
FIGS. 9A, 9B, 9C, and 9D are pictorial side views representing LCD illumination cone angles produced by illuminating various combinations of small and large LCD panels with small and large light sources.

Most portable multimedia projectors employ the combination shown in FIG. 9B and achieve a medium illumination cone angle 130. Such projectors typically achieve about a 500:1 contrast ratio.

Figure 9D:
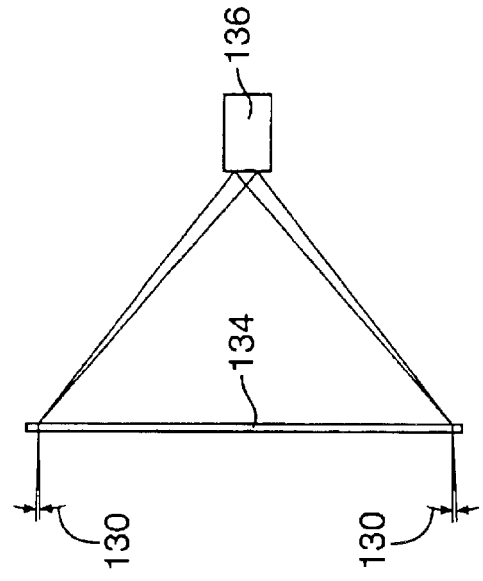
Figure 9A:
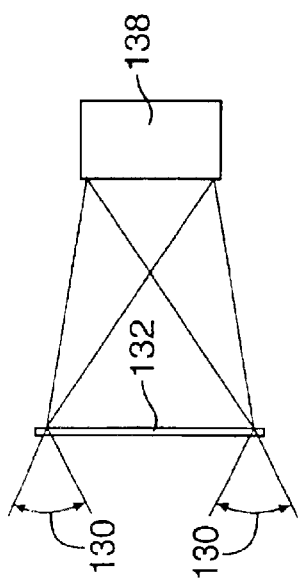
Figure 9C:
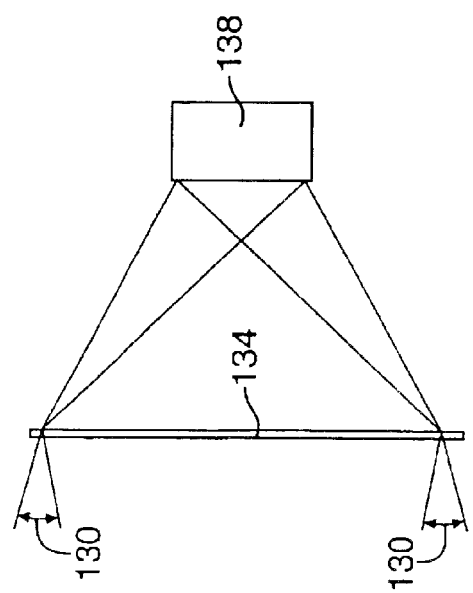

FIG. 9D employing large LCD panel 134 and small light source 136 achieves the smallest illumination cone angle 130 and, therefore, the best possible contrast ratio. Accordingly, another advantage of employing LCD assembly 80 is its large size relative to the effective size of light source 70. This combination of sizes achieves a suitably small illumination cone angle for LCD assembly 80.

Figure 10:
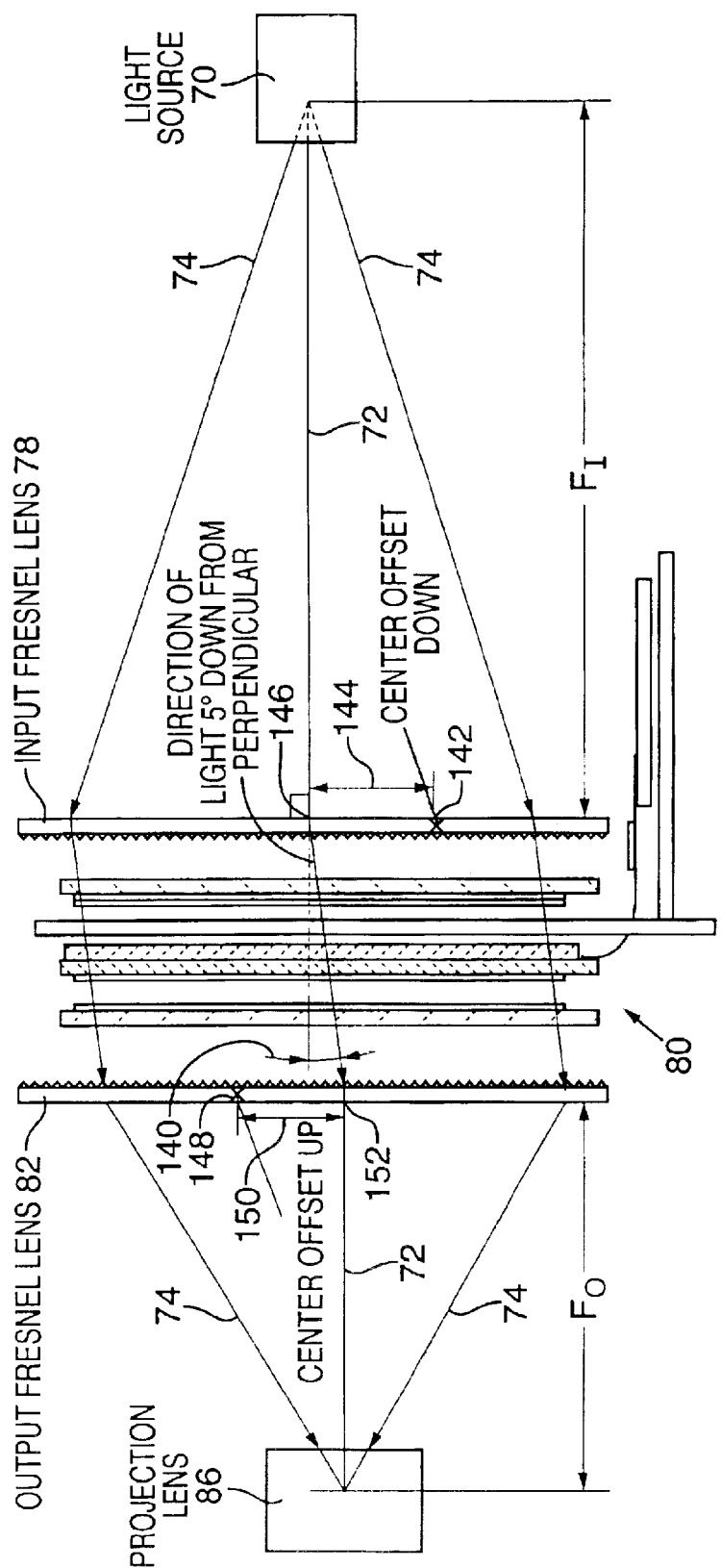
FIG. 10 is a sectional side pictorial view representing the LCD panel of FIG. 8 with adjacent input and output Fresnel lenses having centers that are offset to direct light rays through the LCD panel at an optimal ray angle for achieving a peak contrast ratio from the LCD panel.

FIG. 10 shows a preferred way of achieving an optimal ray angle 140 for propagating principal ray 72 and image margin light rays 74 through LCD assembly 80. Input and output Fresnel lenses 78 and 82 are mounted adjacent and parallel to LCD assembly 80. Input Fresnel lens 78 has a focal length $F_1$ and an optical center 142 that is offset downward a distance 144 from a geometric center 146 of input Fresnel lens 78. Principal ray 72 enters input Fresnel lens 78 at and perpendicular to geometric center 146. Likewise, output Fresnel lens 82 has a focal length $F_o$ and an optical center 148 that is offset upward a distance 150 from a geometric center 152 of output Fresnel lens 82. Principal ray 72 exits output Fresnel lens 82 at and perpendicular to geometric center 152. The differential offsets of optical centers 146 and 150, cause refraction of principal ray 72 and image margin light rays 74 such that they propagate through LCD assembly 80 at a five degree downward angle, which in the preferred embodiment, is optimal ray angle 140.

The relationship among optimal ray angle 140, the Fresnel lens focal lengths, and the optical center offset distances is expressed by the following equation:

$$\text{Offset} = F \tan \theta,$$

where F is the Fresnel lens focal length, the offset is the distance between the principal ray entry or exit point and the optical center, and θ is the ray angle.

Optimal ray angle 140 is preferably minus five degrees as shown, but may range between greater than zero degrees to about 10 degrees in any direction depending on the particular LCD employed. The degree and direction of the optimal ray angle is set by adjusting distances 144 and 150 and their relative offset directions. For example, offsetting optical centers 142 and 148 up and down respectively, rather than down and up as shown, causes principal ray 72 to propagate through LCD assembly 80 at a five degree upward angle. Likewise, offsetting optical centers 142 and 148 left and right causes principal ray 72 to co propagate through LCD assembly 80 at a five degree sideways angle. Of course, diagonal angles can be achieved with diagonal offsets.

As described above, light source 70 contributes to achieving the objects of this invention by providing intense illumination from a relatively small light source size and at a relatively small cone angle.

The benefits of light source 70 are better understood by first understanding that prior LCD projectors typically employ a single high efficiency lamp, usually a metal halide arc lamp, housed in a reflector that directs as much of the light as possible toward the LCD. A parabolic reflector may be employed to produce a collimated beam of light, or an elliptical reflector may be employed to produce a focused beam of light. However, either type of reflector produces a non-uniform distribution of light intensity that is generally brighter toward the center of the beam and dimmer towards the edges. The beam is also circular in shape, which causes a significant illumination loss around the edges of the typically rectangular LCD.

To provide more uniform LCD illumination, prior workers have positioned various kinds of light homogenizers between the light source and the LCD. One approach employs a mirror tunnel to produce a kaleidoscope effect that randomizes the light rays. Another approach employs flyseye lenslet arrays to project light onto the LCD from different regions of the incident light. Yet another relatively expensive approach employs randomized fiberoptic bundles to receive a nonuniform and circular light distribution and efficiently convert it to a uniform and rectangular light distribution. However, single lamp approaches do not provide sufficient light intensity to suitably overcome the transmission loss of LCD assembly 80, and if the lamp burns out, it is too hot to change immediately, causing undesirable projector down-time.

Figure 11:
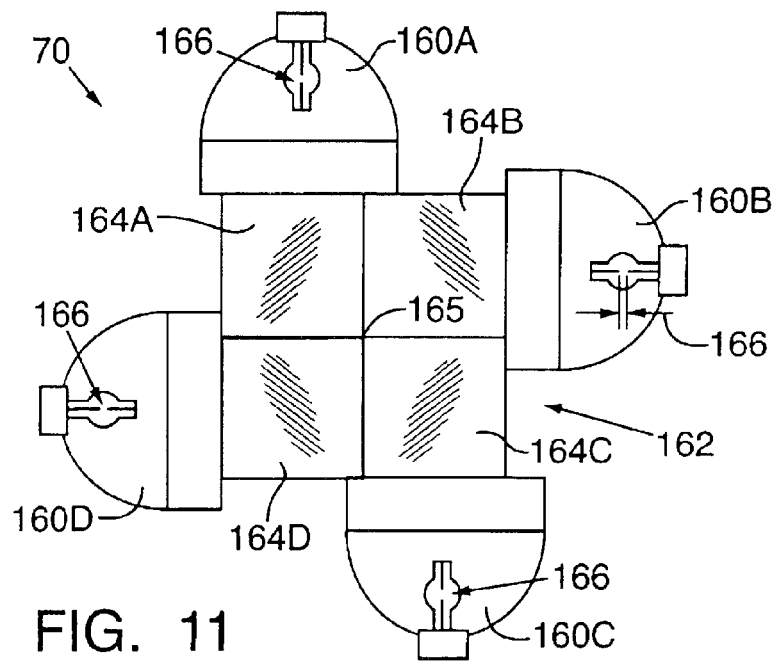
FIG. 11 is a simplified pictorial bottom view of the multi-lamp light source of FIG. 6.

FIG. 11 shows a bottom view of light source 70, which includes multiple, preferably four, 100 mm (3.94 inch) diameter metal halide arc lamps 160A, 160B, 160C, and 160D (collectively "lamps 160") that each have a parabolic reflector to produce collimated light. Lamps 160 are each preferably a model UHP100, manufactured by Philips Lighting, located in Eindhoven, The Netherlands.

Light source 70 further includes a "pinwheel" mirror array 162 comprising fourfold mirrors 164A, 164B, 164C, and 164D (collectively "mirrors 164") that are adjacent at a common corner 165 and are angled downwardly at 45 degree angles to receive the collimated light from each of associated lamps 160 and reflect it 90 degrees to form a single, substantially collimated light bundle. The combination of lamps 160 and pinwheel mirror array 162 provides light bundle collimation to within ±3 degrees without a condenser lens. By way of comparison, a prior light source employing two lamps and a combining prism achieves light bundle collimation to within ±6 degrees with a condenser lens.

Contributing to the ±3 degree collimation of light source 70 is the fact that lamps 160 each preferably have 1.3 mm (0.05 inch) arc gaps 166. The more tightly the arcs can be confined to the focus of the parabolic reflector of lamps 160, the more precise the collimation of the resulting light bundle and the smaller the light source cone angle. However, lamps having 1 mm (0.04 inch) to 7 mm (0.28 inch) arc gaps are suitable alternatives. Such arc gaps are typically less than about two percent of the diagonal dimension of LCD panels employed in this invention.

When light source 70 is employed in combination with LCD assembly 80, 1 mm (0.04 inch) arc gaps 166 are less than 0.3 percent of the 381 mm (15 inch) diagonal measurement of LCD assembly 80. If arc gaps 166 are increased to 7 mm (0.28 inch), their size is still less than 1.8 percent of the LCD diagonal measurement. This large ratio of LCD-to-arc size contributes to the small cone angle and high contrast ratio described with reference to FIG. 9D.

With multiple lamps, the objective is to position the apparent light sources as closely together as possible without regard to the size of each lamp and reflector. By employing pinwheel mirror array 162, the four 100 mm (3.94 inch) diameter lamps 160 produce a generally rectangular total apparent light source having a diagonal size of only 130 mm (5.1 inches). This size is achieved in part by making each of mirrors 164 have an aperture sized to receive light from within the 95 percent illumination circle of each associated lamp 160. The generally rectangular shape of the collimated light bundle more efficiently transmits light to generally rectangular light homogenizers such as the lenslet arrays described below. Skilled workers will also appreciate that the optical components of this invention are designed to minimize Etendue loss. Accordingly, the effective light source size is related to lamp arc size.

Figure 12:
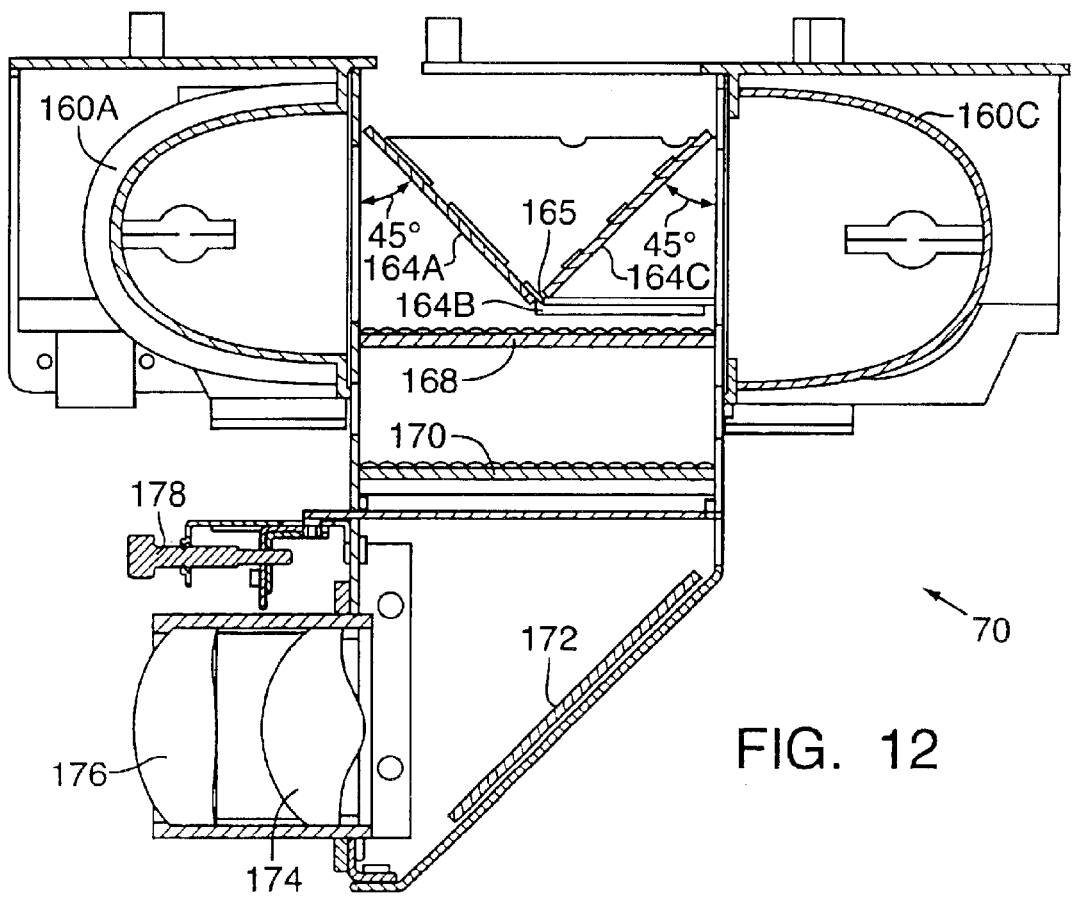
FIG. 12 is a cross-sectional view of the multi-lamp light source of FIGS. 6 and 11, taken along lines 12—12 of FIG. 6 to reveal optical path components.

FIG. 12 is a cross-sectional view of light source 70 showing its construction details and additional optical components. The collimated, generally rectangular light bundle propagating from pinwheel mirrors 164 illuminates a first lenslet array platel 68, which focuses the light on a second lenslet array plate 170. Because first lenslet array plate 168 is at the focus of second lenslet array plate 170, and vice versa, the second lenslets form images of the first lenslets, which images are reflected by a fold mirror 172, combined by an aspherical condenser lens 174, and projected by a relay lens 176 toward LCD assembly 80 (FIG. 6). A focusing screw 178 provides proper imaging of light source 70 on LCD assembly 80.

Light source 70 is advantageous because it seamlessly collimates and efficiently integrates the light from multiple lamps 160 so that the spectral characteristics and illumination distributions of each lamp are blended to provide an average distribution of light intensity and spectral color. The "hole in the middle" effect, which is typical of arc lamps, is also reduced. Because of the sizing and positioning of mirrors 164 relative to lamps 160, a smaller and less expensive lenslet array system may be employed. Light source 70 also provides a small light source cone angle, a compressed light source size, and suitable brightness to overcome the transmission loss through LCD assembly 80. Moreover, projector 12 will still function if three or fewer of lamps 160 burn out.

Skilled workers will recognize that portions of this invention may be implemented differently from the implementations described above for preferred embodiments. For example, the light source may have fewer or more than four lamps; different sizes of light sources, LCDs, and projection screens may be employed; as may different fold mirror configurations and angles, or even no fold mirrors; LCDs initially designed for projection displays rather than direct viewing; conventional lenses rather than Fresnel lenses; and the optimal ray angle may be directed by optical component tilts rather than offsets and/or refraction.

It will be obvious to those having skill in the art that many changes may be made to the details of the above-described embodiments of this invention without departing from the underlying principles thereof. Accordingly, it will be appreciated that this invention is also applicable to display applications other than those found in rear screen LCD projection displays. The scope of this invention should, therefore, be determined only by the following claims.

We claim:

1. A high performance light pattern projection apparatus, comprising:
   a light source including multiple arc lamps, the light source having an effective source size and emitting a principal light ray and an associated bundle of polychromatic light rays;
   multiple fold mirrors in the form of a pinwheel-shaped mirror configuration, each fold mirror associated with a different one of the arc lamps so that the bundle of polychromatic light rays is substantially collimated;
   a liquid crystal display (LCD) panel adapted to form a light pattern in response to incident polychromatic light rays emitted from the light source and applied signals carrying light pattern information; and
   an optical lens device including a flyseye lens array light homogenizer system positioned to receive and having optical light directing properties to steer the principal light ray and associated substantially collimated bundle of polychromatic light rays for incidence as homogenized light rays on the LCD panel at substantially the same angle that contributes to formation of the light pattern at a contrast ratio of at least 1000:1.

2. The apparatus of claim 1 in which the effective source size ranges from about one millimeter to about seven millimeters.

3. The apparatus of claim 1 further including a projection lens for projecting the light pattern on a screen at a magnification ratio of less than about 10×.

4. The apparatus of claim 3 in which the magnification ratio ranges from about 4× to about 10×.

5. The apparatus of claim 3 which the projection lens includes five or fewer optical lens elements.

6. The apparatus of claim 1 in which the LCD panel includes amorphous silicon thin film transistors.

7. The apparatus of claim 1 in which the LCD panel has an operational life of at least 50,000 hours before the light pattern displays a substantial color degradation.

8. The apparatus of claim 1 in which the LCD panel has an SXGA or greater resolution.

9. The apparatus of claim 1 in which the bundle of polychromatic light rays propagates through the LCD panel at a divergence angle that is less than about +6 degrees relative to the angle of the principal light ray.

10. A high performance image projection apparatus, comprising:
    a light source including multiple arc lamps, the light source having an effective source size and generating a principal ray and associated light rays;
    multiple fold mirrors in the form of a pinwheel-shaped mirror configuration, each fold mirror associated with a different one of the arc lamps, and the fold mirrors coacting to direct the light rays along parallel pathways to form a substantially collimated light bundle;
    a flyseye lens array light homogenizer system that receives the substantially collimated light bundle to produce homogenized light rays;
    a liquid crystal display (LCD) panel for receiving the principal ray and the homogenized light rays to generate an image, the LCD panel having a major surface and a panel diagonal dimension of such a size that the effective source size is two percent or less than the panel diagonal dimension; and
    a Fresnel lens that receives and refracts the principal ray from the light source directing the principal ray to propagate through the LCD panel at an optimal ray angle that causes the image to have a maximized contrast ratio, the optimal ray angle being in a range from about zero degrees to about ten degrees from normal to the major surface.

11. The apparatus of claim 10 in which the effective source size ranges from about one millimeter to about seven millimeters.

12. The apparatus of claim 10 in which the LCD panel has a diagonal dimension that is greater than about 50 millimeters.

13. The apparatus of claim 10 in which the LCD panel has a diagonal dimension that is about 380 millimeters.

14. The apparatus of claim 10 in which the LCD panel includes amorphous silicon thin film transistors.

15. The apparatus of claim 10 in which the LCD panel has an SXGA or greater resolution.

16. The apparatus of claim 10 further including a projection screen and in which the image projection apparatus is a rear screen projector.

* * * * *